United States Patent
Lee et al.

(10) Patent No.: US 10,322,366 B2
(45) Date of Patent: Jun. 18, 2019

(54) WET-TYPE CARBON DIOXIDE CAPTURING EQUIPMENT

(71) Applicant: KEPCO ENGINEERING & CONSTRUCTION COMPANY, INC., Gimcheon-si, Gyeongsangbuk-do (KR)

(72) Inventors: Young Ill Lee, Gimcheon-si (KR); Tea Young Lim, Gimcheon-si (KR); Seong Pill Cho, Gimcheon-si (KR); Eun Kyu Choi, Gumi-si (KR); Sung Mun Yoon, Gimcheon-si (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 232 days.

(21) Appl. No.: 15/638,490

(22) Filed: Jun. 30, 2017

(65) Prior Publication Data

US 2018/0078892 A1    Mar. 22, 2018

(30) Foreign Application Priority Data

Sep. 20, 2016  (KR) .................. 10-2016-0120140

(51) Int. Cl.
*B01D 53/18* (2006.01)
*B01D 53/14* (2006.01)
(Continued)

(52) U.S. Cl.
CPC ..... *B01D 53/1475* (2013.01); *B01D 53/1425* (2013.01); *F01K 7/22* (2013.01);
(Continued)

(58) Field of Classification Search
CPC .... B01D 53/14; B01D 53/18; B01D 53/1425; B01D 53/1475; B01D 2257/504; B01D 2259/65; Y02C 10/04; Y02C 10/06
(Continued)

(56) References Cited

U.S. PATENT DOCUMENTS 8,858,906 B2 * 10/2014 Eksilioglu .......... B01D 53/1425
                                                              423/228
8,920,548 B2    12/2014 Hokari et al.

FOREIGN PATENT DOCUMENTS

JP    4738434    8/2011
JP    5402842    1/2014
(Continued)

OTHER PUBLICATIONS

Korean Office Action issued in Korean App. No. 10-2016-0120140 dated Dec. 19, 2017.
(Continued)

*Primary Examiner* — Thuan D Dang
(74) *Attorney, Agent, or Firm* — Nixon Peabody LLP; Jeffrey L. Costellia

(57) ABSTRACT

Wet-type carbon dioxide capturing equipment includes a $CO_2$ absorption tower where $CO_2$ of an exhaust gas reacts with an absorbent, a $CO_2$ stripping tower where $CO_2$ is separated from a rich solution absorbed the $CO_2$ in the $CO_2$ absorption tower, a reboiler for supplying thermal energy to the $CO_2$ stripping tower to separate the $CO_2$ from the rich solution in the $CO_2$ stripping tower, a first heat exchanger for heating the rich solution by exchanging heat between a lean solution having the $CO_2$ separated therefrom in the $CO_2$ stripping tower and the rich solution, a mechanical vapor recompressor (MVR) for compressing a $CO_2$ gas separated in the $CO_2$ stripping tower, and a second heat exchanger for separating a portion of $CO_2$ from the rich solution by heating the rich solution by exchanging heat between the $CO_2$ gas compressed in the MVR and the rich solution passing through the first heat exchanger, in which the rich solution having $CO_2$ that is not separated in the second heat exchanger is input to the $CO_2$ stripping tower where the $CO_2$ is separated.

12 Claims, 4 Drawing Sheets

(51) Int. Cl.
  *F01K 7/22*   (2006.01)
  *F01K 17/06*  (2006.01)
  *F23J 15/02*  (2006.01)
  *F23J 15/04*  (2006.01)

(52) U.S. Cl.
  CPC .............. *F01K 17/06* (2013.01); *F23J 15/02* (2013.01); *F23J 15/04* (2013.01); *B01D 2257/504* (2013.01); *B01D 2258/0283* (2013.01); *B01D 2259/65* (2013.01); *F23J 2215/50* (2013.01); *F23J 2219/40* (2013.01); *Y02A 50/2342* (2018.01); *Y02C 10/06* (2013.01); *Y02E 20/326* (2013.01)

(58) Field of Classification Search
  USPC ......... 95/236, 178, 179, 180, 183, 193, 194, 95/227, 228; 96/234, 242, 266; 423/220
  See application file for complete search history.

(56) References Cited

FOREIGN PATENT DOCUMENTS

| | | |
|---|---|---|
| JP | 5559067 | 7/2014 |
| JP | 5901296 | 4/2016 |

OTHER PUBLICATIONS

Korean Notice of Allowance (Application No. 10-2016-0120140), dated May 31, 2018.

\* cited by examiner

WET-TYPE CARBON DIOXIDE CAPTURING EQUIPMENT

CROSS-REFERENCE TO RELATED APPLICATION

This application claims the benefit of Korean Patent Application No. 10-2016-0120140, filed on Sep. 20, 2016, in the Korean Intellectual Property Office, the disclosure of which is incorporated herein in its entirety by reference.

BACKGROUND

1. Field

One or more embodiments relate to wet-type carbon dioxide capturing equipment, and more particularly, to wet-type carbon dioxide capturing equipment having a structure for reducing energy needed to separate carbon dioxide from an absorbent.

2. Description of the Related Art

Recently, as the seriousness of the global warming phenomenon has been recognized, countries around the world are struggling to prepare measures against greenhouse gases. One of the biggest factors in global warming is carbon dioxide ($CO_2$). Accordingly, studies are being actively carried out on technologies for efficiently capturing and reducing carbon dioxide, which is the most important of the greenhouse gases, in exhaust gas.

Although there are many techniques for capturing carbon dioxide, an absorption method is considered to be more economical and more easily applied to a process than other techniques. Among the absorption methods, a chemical absorption method is advantageous in that carbon dioxide removal efficiency is high because carbon dioxide in the exhaust gas is selectively separated using a chemical reaction.

Carbon capture & storage (CCS) collectively refers to technologies that enable the capture, compression, transfer, and storage of carbon dioxide. Among the technologies, a wet-type amine process, which is a technique for separating carbon dioxide in the exhaust gas discharged from a thermal power plant by a chemical absorption process, is evaluated as an appropriate technique for commercialization.

In general, liquid amine compounds or liquid ammonia characteristically absorbs carbon dioxide and can be used to remove a sulfur component in a petroleum refining process or to separate carbon dioxide from the exhaust gas from a thermal power plant.

FIG. 1 illustrates an example of wet-type carbon dioxide capturing equipment employing a general wet-type amine process, according to the related art.

Referring to FIG. 1, the fundamental structure of a wet-type chemical absorption process using amine may include an absorption tower 20 for contact between an amine-based absorbent and an exhaust gas, a stripping tower 30 for separating the absorbed carbon dioxide, and exhaust gas pretreatment equipment. A typical absorbent includes monoethanolamine (MEA), and an improved absorbent for a wet-type CCS may be used to save renewable energy and prevent deterioration of the absorbent.

For example, when wet-type amine CCS is applied to a coal-fired power plant, exhaust gas is input to the CCS after passing through flue-gas desulfurization (FGD) equipment, selective catalytic reduction (SCR) equipment, and dust collection equipment. The content of carbon dioxide in the exhaust gas may vary according to combusted fuel and operation conditions, but is generally about 15 Vol. %. The exhaust gas passing through the FGD equipment and so forth passes through a gas-gas heat exchanger (GGH), and an exhaust gas 71 is input to a separate SOx absorption tower 10 where sulfur oxides are further removed.

As such, when an exhaust gas 72 that has passed through the exhaust gas pretreatment equipment is input to a lower portion of the absorption tower 20 for absorbing $CO_2$ and a liquid absorbent 81 is provided to an upper portion of the absorption tower 20, the exhaust gas 72 and the liquid absorbent 81 have flow counter to each other in the absorption tower 20, forming a gas-liquid contact, and thus $CO_2$ is absorbed by the liquid absorbent 81. In this state, a removal rate may be about 90%. An exhaust gas 73 removed of $CO_2$ is discharged from the upper portion of the absorption tower 20, and a $CO_2$-rich absorbent (hereinafter, referred to as the rich solution) (82) absorbing $CO_2$ is discharged from the lower portion of the absorption tower 20. The absorbent that has absorbed $CO_2$, that is, the rich solution 82, contains $CO_2$, and a temperature thereof is about 40-50° C. The exhaust gas 73 removed of $CO_2$ has a temperature lowered to about 40° C. due to a water spray in the upper portion of the absorption tower 20. The exhaust gas 73 is discharged through the GGH of the FGD equipment again or a separate funnel.

The rich solution 82 is input to a plate-type heat exchanger 50 by a rich solution pump 21. A rich solution 83 heated to a temperature of about 90-100° C. as sensible heat is collected while passing through the plate-type heat exchanger 50 is input to an upper portion of the stripping tower 30.

While flowing from the upper portion to a lower portion of the stripping tower 30, the rich solution 83 is heated by thermal energy to be separated into the absorbent and $CO_2$, and the separated $CO_2$ is discharged from the upper portion of the stripping tower 30. High-concentration $CO_2$ 91 discharged from the upper portion of the stripping tower 30 has a temperature of about 105-120° C., which is almost identical to the temperature of the stripping tower 30, and contains moisture corresponding to a saturated water vapor pressure. Accordingly, the moisture is removed through a condenser 60, and the removed moisture is input again, as condensed water 92, to the stripping tower 30. The temperature of $CO_2$ 93 removed of the moisture is about 40° C. $CO_2$ is compressed to be transferred/stored or reused. To this end, the $CO_2$ separated in the stripping tower 30 is processed to remove moisture through the condenser 60 and a reflux drum, and then flows out to undergo compression and liquefaction processes. In compression and liquefaction, compression pressure and temperature are set according to a transfer method. When transferred by using ships or tank trucks, $CO_2$ is compressed at −20° C. and 20 bar·g, and when transferred by using pipes, $CO_2$ is compressed at 31° C. and 150 bar·g.

A $CO_2$-lean absorbent (hereinafter, referred to as the lean solution) 84 is discharged from the lower portion of the stripping tower 30. The temperature of the lean solution 84 is about 105-120° C., and the lean solution 84 is input to the plate-type heat exchanger 50 to transfer the sensible heat to the rich solution 82. The lean solution 84 that has lost the sensible heat is as the liquid absorbent 81 to the upper portion of the absorption tower 20 by a lean solution pump 22 to contact the exhaust gas 72 which was removed of sulfur oxide in the SOx absorption tower 10.

As such, the lean solution 84 with $CO_2$ separated therefrom is discharged from the lower portion of the stripping tower 30. A portion of an absorbent 85 in the $CO_2$ separation process in the stripping tower 30 is input to a reboiler 40. Steam of about 3 bar·g or more is input to the reboiler 40, and the steam 94 heats the absorbent 85 in the reboiler 40. In the reboiler 40, $CO_2$ and vapor are generated from the absorbent 85, and a mixed gas 95 is input to the stripping tower 30 to provide thermal energy to separate $CO_2$ from the rich solution 83. An absorbent 86 with $CO_2$ separated therefrom in the reboiler 40 is input again to the stripping tower 30. The vapor 94 input to the reboiler 40 transfers latent heat and is input, in the form of condensed water 96, to a condensed water tank 70 where water is collected and then transferred to a steam production process.

As described above, in the wet-type carbon dioxide capturing equipment according to the related art, according to a sensible heat collection structure between the absorption tower 20 and the stripping tower 30, when a temperature difference between the rich solution 82 discharged from the lower portion of the absorption tower 20 and the lean solution 84 discharged from the lower portion of the stripping tower 30 is large, a sensible heat exchange is performed between the two solutions through the plate-type heat exchanger 50, and thus heat is collected. The collected sensible heat increases the temperature of the rich solution 83 input to the stripping tower 30, and thus heat duty of the reboiler 40 needed in the stripping tower 30 may be reduced.

As the temperature of the rich solution 83 input to the stripping tower 30 after passing through the plate-type heat exchanger 50 increases, the collection of sensible heat increases, and thus input of thermal energy to the stripping tower 30 may be reduced. However, as the temperature of the upper portion of the stripping tower 30 increases, cooling duty of the condenser 60 increases accordingly. In other words, a re-liquefaction ratio increases. Accordingly, the temperature of the rich solution 83 input to the stripping tower 30 and the cooling duty of the condenser 60 have a trade-off relationship, and thus the sensible heat should not be limitlessly collected in the plate-type heat exchanger 50.

Furthermore, the rich solution 83 may be separated into $CO_2$ and the absorbent in the plate-type heat exchanger 50, that is, a two-phase phenomenon may occur. In this case, as control of a circulation speed of an absorbent is difficult, a liquid/gas phase ratio (a ratio of an absorbent and an exhaust gas) varies, and thus a stable operation is not guaranteed. Accordingly, in order to restrict the occurrence of the two-phase phenomenon, the rich solution 83 is in a liquid phase until it is input to the stripping tower 30 via the plate-type heat exchanger 50, and thus collection of sensible heat is limited.

As such, in spite of the merit of its high $CO_2$ removal performance, the wet-type carbon dioxide capturing equipment according to the related art employing the wet-type amine CCS process has a drawback in that a very large amount of thermal energy is consumed to separate $CO_2$ from the absorbent in the stripping tower 30.

SUMMARY

One or more embodiments include wet-type carbon dioxide capturing equipment having a structure which reduces energy required to separate carbon dioxide from an absorbent in a $CO_2$ stripping tower.

Additional aspects will be set forth in part in the description which follows and, in part, will be apparent from the description, or may be learned by practice of the presented embodiments.

According to one or more embodiments, wet-type carbon dioxide capturing equipment includes a CO2 absorption tower configured to have CO2 of an exhaust gas react with an absorbent, a CO2 stripping tower configured to separate CO2 from a rich solution that absorbs the CO2 in the CO2 absorption tower, a reboiler configured to supply thermal energy to the CO2 stripping tower to separate the CO2 from the rich solution in the CO2 stripping tower, a first heat exchanger configured to heat the rich solution by exchanging heat between a lean solution having the CO2 separated therefrom in the CO2 stripping tower and the rich solution that absorbs the CO2 in the CO2 absorption tower, a mechanical vapor recompressor (MVR) configured to compress a CO2 gas that is separated in the CO2 stripping tower, and a second heat exchanger configured to separate a portion of CO2 from the rich solution by heating the rich solution by exchanging heat between the CO2 gas compressed in the MVR and the rich solution passing through the first heat exchanger, in which the rich solution having CO2 that is not separated in the second heat exchanger is input to the CO2 stripping tower where the CO2 is separated.

The first heat exchanger may be a plate-type heat exchanger, the second heat exchanger may be a shell & tube heat exchanger, the CO2 gas compressed in the mechanical vapor recompressor may be input to a tube side of the second heat exchanger, and the rich solution passing through the first heat exchanger may be input to a shell side of the second heat exchanger.

Steam may be input to the reboiler as a heat source, the steam may be condensed by transferring latent heat to the CO2 stripping tower via the reboiler, and condensed water generated as the steam is condensed may be input to a first condensed water tank.

The condensed water may be generated as the CO2 gas input to the second heat exchanger loses heat, a mixed fluid of the CO2 gas, vapor, and the condensed water may be input to a second condensed water tank, and the condensed water separated from the mixed fluid in the second condensed water tank may be input to the CO2 stripping tower.

The wet-type carbon dioxide capturing equipment may further include a third heat exchanger that is configured to exchange heat between the exhaust gas removed of the CO2 in the CO2 absorption tower and the CO2 gas removed of the condensed water in the second condensed water tank.

The wet-type carbon dioxide capturing equipment may further include a second mechanical vapor recompressor (MVR) configured to compress the CO2 gas removed of the condensed water in the second condensed water tank, a fourth heat exchanger configured to separate a portion of the CO2 from the rich solution by heating the rich solution by exchanging heat between the compressed CO2 gas compressed in the second MVR and a portion of the rich solution passing through the first heat exchanger, in which the rich solution having CO2 that is not separated in the fourth heat exchanger is input to the CO2 stripping tower together with the rich solution having CO2 that is not separated in the second heat exchanger.

The fourth heat exchanger may be a shell & tube heat exchanger, the CO2 gas compressed in the second mechanical vapor recompressor may be input to a tube side of the fourth heat exchanger, and a portion of the rich solution passing through the first heat exchanger may be input to a shell side of the fourth heat exchanger.

The condensed water may be generated as the CO2 gas input to the fourth heat exchanger loses heat, a mixed fluid of the CO2 gas, vapor, and the condensed water may be input to a third condensed water tank, and the condensed water separated from the mixed fluid in the third condensed water tank may be input to the CO2 stripping tower.

The wet-type carbon dioxide capturing equipment may further include a third heat exchanger that is configured to exchange heat between the exhaust gas removed of the CO2 in the CO2 absorption tower and the CO2 gas removed of the condensed water in the third condensed water tank.

The wet-type carbon dioxide capturing equipment may further include a thermal vapor recompressor (TVR) that is configured to compress revaporized vapor generated in the first condensed water tank and supply the revaporized vapor to the reboiler.

A heat exchanger may be mounted in the first condensed water tank, and the heat exchanger may exchange heat between the CO2 gas removed of the condensed water in the second condensed water tank and the condensed water in the first condensed water tank.

The wet-type carbon dioxide capturing equipment may further include a third heat exchanger that is configured to exchange heat between the exhaust gas removed of the CO2 in the CO2 absorption tower and the CO2 gas passing through the heat exchanger mounted in the first condensed water tank.

According to the wet-type carbon dioxide capturing equipment according to an embodiment, since a portion of $CO_2$ is separated from the rich solution by the MVR and the second heat exchanger, the amount of the rich solution input to the upper portion of the $CO_2$ stripping tower, where $CO_2$ is not separated, is reduced as compared to the related art. Accordingly, as the amount of thermal energy supplied to the $CO_2$ stripping tower via the reboiler may be reduced, heat duty of the reboiler may be further reduced.

Furthermore, according to the related art, when $CO_2$, from which only the moisture is removed in the $CO_2$ stripping tower, is input to a compression/liquefaction process, the pressure of $CO_2$ is within about 0.3-0.8 bar·g. In contrast, when the $CO_2$ gas removed of the condensed water according to the present embodiment is input to the compression/liquefaction process, the pressure of the $CO_2$ gas increases, and thus load of the compression process is lowered.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
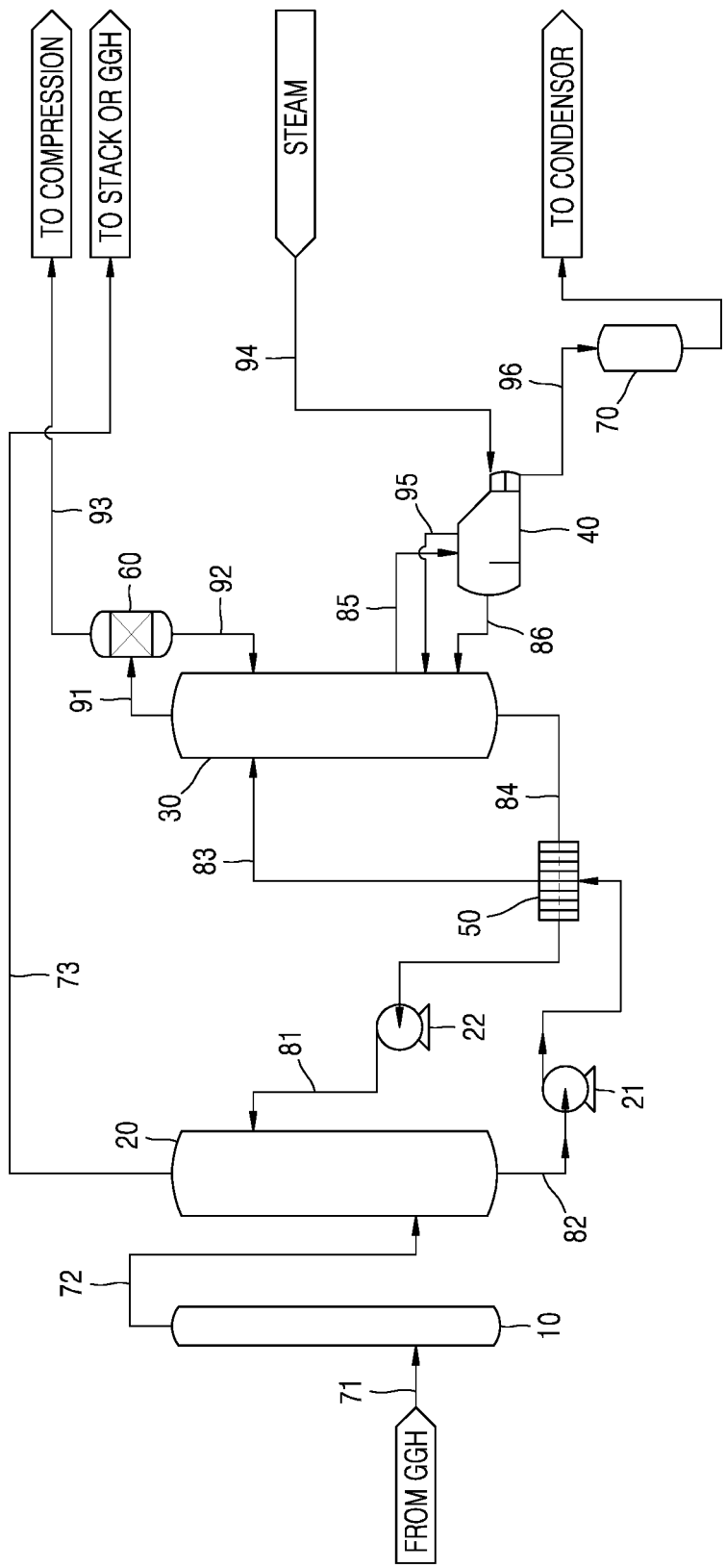
FIG. 1 illustrates a wet-type carbon dioxide capturing equipment employing a general wet type amine process, according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Figure 2:
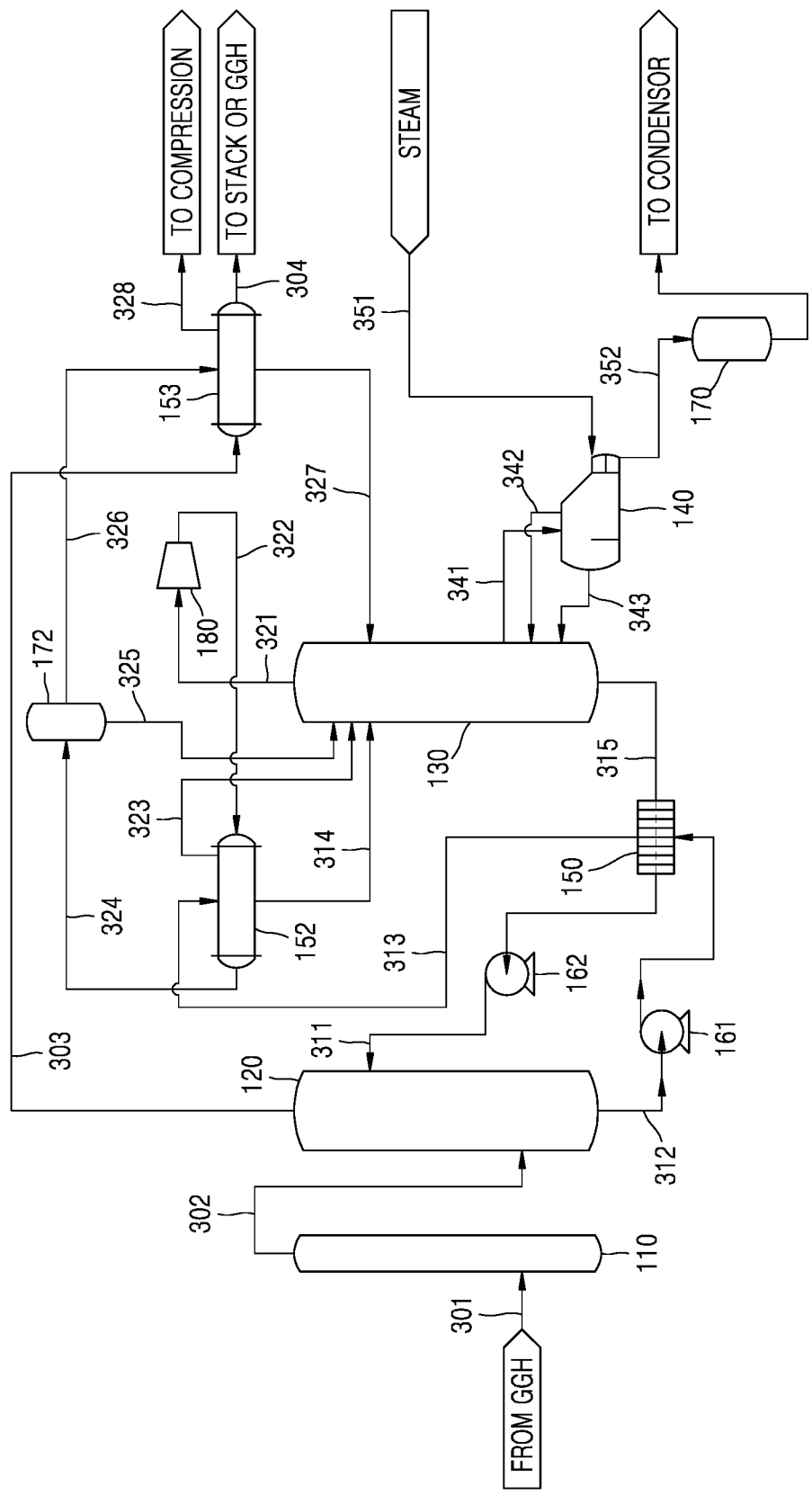
FIG. 2 illustrates a wet-type carbon dioxide capturing equipment according to an embodiment.

FIG. 2 illustrates a wet-type carbon dioxide capturing equipment according to an embodiment.

Referring to FIG. 2, the wet-type carbon dioxide capturing equipment according to the present embodiment is used to separate carbon dioxide ($CO_2$) from an exhaust gas discharged from a thermal power plant in a chemical absorption process. For example, a wet-type amine carbon capture & storage (CCS) process may be employed. However, the present disclosure is not limited to the wet-type amine CCS process.

The wet-type carbon dioxide capturing equipment according to the present embodiment may include a $CO_2$ absorption tower 120, a $CO_2$ stripping tower 130, a reboiler 140, a first heat exchanger 150, a mechanical vapor recompressor (MVR) 180, and a second heat exchanger 152.

For example, the exhaust gas discharged from the thermal power plant passes through exhaust gas pretreatment equipment, for example, flue-gas desulfurization (FGD) equipment, selective catalytic reduction (SCR) equipment, and/or dust collection equipment. The content of carbon dioxide among the exhaust gas varies according to a combusted fuel and operating conditions, but is generally about 15 Vol. %. The exhaust gas passing through the FGD equipment passes through a gas-gas heat exchanger (GGH), and an exhaust gas 301 is input to a SOx absorption tower 110 where sulfur oxides are further removed. As such, although SOx is removed while the exhaust gas 301 passes through the exhaust gas pretreatment equipment, an exhaust gas 302 including $CO_2$ is input to a lower portion of the $CO_2$ absorption tower 120.

The $CO_2$ absorption tower 120 is where the $CO_2$ of the exhaust gas reacts with a liquid absorbent, for example, an amine absorbent. In detail, a liquid absorbent 311 is input to an upper portion of the $CO_2$ absorption tower 120. As the absorbent 311 and the exhaust gas 302 flow counter to each other in the $CO_2$ absorption tower 120, gas-liquid contact is performed, and thus, $CO_2$ of the exhaust gas 302 is absorbed by the absorbent 311. In this state, a removal rate of the $CO_2$ of the exhaust gas is about 90%.

A $CO_2$-rich absorbent 312 absorbing $CO_2$ as above (hereinafter, referred to as the rich solution 312) is discharged through a lower portion of the $CO_2$ absorption tower 120. The rich solution 312 contains $CO_2$ and has a temperature of about 40-50° C.

An exhaust gas 303 removed of $CO_2$ is discharged from the upper portion of the $CO_2$ absorption tower 120. In the process, the temperature of the exhaust gas 303 may be lowered to about 40° C. due to water spray in the upper portion of the $CO_2$ absorption tower 120.

The rich solution 312 discharged through the $CO_2$ absorption tower 120 is input to the first heat exchanger 150 by a rich solution pump 161. A plate-type heat exchanger may be used as the first heat exchanger 150. The temperature of the rich solution 312 may be increased as the rich solution 312 collects sensible heat through heat exchange with an absorbent 315 to be described later while passing though the first heat exchanger 150. In this state, the rich solution 312 is heated to a temperature of, for example, about 90-100° C., at which a two-phase phenomenon may be prevented and a liquid phase may be maintained.

As such, a rich solution 313 heated by collecting the sensible heat is input to the second heat exchanger 152. A shell & tube heat exchanger may be used as the second heat exchanger 152. While passing through the second heat exchanger 152, the rich solution 313 is heated through heat exchange with a $CO_2$ gas 322 compressed by the MVR 180 to be described later.

As the rich solution 313 is heated in the second heat exchanger 152, $CO_2$ is partially separated from the rich solution 313, and a rich solution 314 having $CO_2$ that is not yet separated is input to an upper portion of the $CO_2$ stripping tower 130.

The $CO_2$ stripping tower 130 is where $CO_2$ is separated from the rich solution 314 through heating. In detail, the rich solution 314 is separated into the absorbent and $CO_2$ by being heated by thermal energy while flowing from the upper portion of the $CO_2$ stripping tower 130 to a lower portion thereof.

The reboiler 140 supplies thermal energy to the $CO_2$ stripping tower 130 to separate $CO_2$.

In detail, steam 351 of about 3 bar·g or more, as a heat source, is input to the reboiler 140. Furthermore, a portion of an absorbent 341 in the $CO_2$ separation process in the $CO_2$ stripping tower 130 is input to the reboiler 140 and heated in the reboiler 140 by the steam 351. Accordingly, $CO_2$ and vapor are generated from the absorbent 341 in the reboiler 140, and a mixed gas 342 of $CO_2$ and vapor is input to the $CO_2$ stripping tower 130 and provides thermal energy to separate $CO_2$ from the rich solution 314. An absorbent 343 removed of $CO_2$ in the reboiler 140 is input again to the $CO_2$ stripping tower 130. The steam 351 input to the reboiler 140 transfers latent heat and is condensed, and condensed water 352 generated accordingly is input to a first condensed water tank 170 where water is collected and then transferred to a steam production process.

The $CO_2$ separated in the $CO_2$ stripping tower 130 is discharged from the upper portion of the $CO_2$ stripping tower 130, and the absorbent 315 removed of $CO_2$ (hereinafter, referred to as the lean solution) is discharged from the lower portion of the $CO_2$ stripping tower 130.

The temperature of the lean solution 315 is about 105-120° C., and as described above, is input to the first heat exchanger 150 and transfers the sensible heat to the rich solution 312 through heat exchange. The lean solution 315 removed of $CO_2$ and having lost the sensible heat, that is, the recycled absorbent 311, is input to the upper portion of the $CO_2$ absorption tower 120 by a lean solution pump 162, so as to contact the exhaust gas 302 removed of sulfur oxide.

A $CO_2$ gas 321 discharged from the upper portion of the $CO_2$ stripping tower 130 has a temperature of about 105-120° C., a pressure of about 0.3-0.8 bar·g, and moisture of about 40%. The $CO_2$ gas 321 is input to the MVR 180 to be compressed. In this state, the moisture included in the $CO_2$ gas 321 has latent heat energy that increases as the pressure increases. Compared to a compression ratio of a typical compressor of about 4, the MVR 180 that compresses vapor has a compression ratio of about 2. The $CO_2$ gas 321 may be compressed by using a one-step or multi-step compressor. A $CO_2$ gas 322 compressed in the MVR 180 is input to the second heat exchanger 152 at a high temperature. A shell & tube heat exchanger may be used as the second heat exchanger 152. The $CO_2$ gas 322 that is compressed may be input to a tube side of the second heat exchanger 152.

Furthermore, as described above, the rich solution 313 that is heated by collecting the sensible heat from the first heat exchanger 150 is input to a shell side of the second heat exchanger 152. The rich solution 313 is heated through the heat exchange with the compressed $CO_2$ gas 322 in the second heat exchanger 152. Since the $CO_2$ gas 322 compressed in the MVR 180 has a higher temperature than the rich solution 313, heat exchange is possible. Accordingly, $CO_2$ is partially separated from the rich solution 313 and vapor is partially generated therefrom. A mixed gas 323 of the $CO_2$ gas and the vapor separated in the second heat exchanger 152 is input to the upper portion of the $CO_2$ stripping tower 130. The rich solution 314 having $CO_2$ that is not yet separated in the second heat exchanger 152 is input to the upper portion of the $CO_2$ stripping tower 130 as described above.

The compressed $CO_2$ gas 322 input to the second heat exchanger 152 loses heat, and the moisture thereof is condensed so that condensed water is generated. However, since the temperature of the $CO_2$ gas 322 is still high, a portion of the moisture remains as vapor. A mixed fluid 324 in which the compressed $CO_2$ gas, the vapor, and the condensed water are mixed is input to a second condensed water tank 172. Condensed water 325 separated from the mixed fluid 324 in the second condensed water tank 172 is input to the upper portion of the $CO_2$ stripping tower 130.

A compressed $CO_2$ gas 326 removed of the condensed water 325 in the second condensed water tank 172 is input to a third heat exchanger 153. A shell & tube heat exchanger may be used as the third heat exchanger 153. The compressed $CO_2$ gas 326 may be input to a shell side of the third heat exchanger 153. The exhaust gas 303 removed of $CO_2$ in the $CO_2$ absorption tower 120 is input to a tube side of the third heat exchanger 153. The temperature of the exhaust gas 303 is lowered to about 40° C. due to water spray in the upper portion of the $CO_2$ absorption tower 120. However, since the exhaust gas 303 is discharged through the GGH of the FGD equipment or a separate funnel, a temperature of about 95-100° C. is needed.

Accordingly, in the third heat exchanger 153, the exhaust gas 303 is heated through heat exchange, and as the temperature of the compressed $CO_2$ gas 326 is lowered, the compressed $CO_2$ gas 326 loses latent heat, and thus moisture of the compressed $CO_2$ gas 326 is condensed and condensed water 327 is generated. The condensed water 327 is input to the $CO_2$ stripping tower 130. A $CO_2$ gas 328 that has partially lost moisture and is compressed is transferred to a compression and liquefaction process in a low-temperature state. The temperature of the exhaust gas 303 removed of $CO_2$ is increased by heat exchange, and an exhaust gas 304 having an increased temperature is discharged through the GGH of the FGD equipment or a separate funnel.

As described above, in the wet-type carbon dioxide capturing equipment according to an embodiment, since a portion of $CO_2$ is separated from the rich solution 313 by the MVR 180 and the second heat exchanger 152, the amount of the rich solution 314 input to the upper portion of the $CO_2$ stripping tower 130, where $CO_2$ is not separated, is reduced compared to the related art. Accordingly, as the amount of thermal energy supplied to the $CO_2$ stripping tower 130 via the reboiler 140 may be reduced, heat duty of the reboiler 140 may be further reduced.

Furthermore, according to the related art, when $CO_2$, from which only the moisture is removed in the $CO_2$ stripping tower 130, is input to a compression/liquefaction process, the pressure of the $CO_2$ is within about 0.3-0.8 bar~g. In contrast, when the $CO_2$ gas 328 removed of condensed water, according to the present embodiment, is input to the compression/liquefaction process, the pressure of the $CO_2$ gas 328 increases, and thus load of the compression process is lowered.

Figure 3:
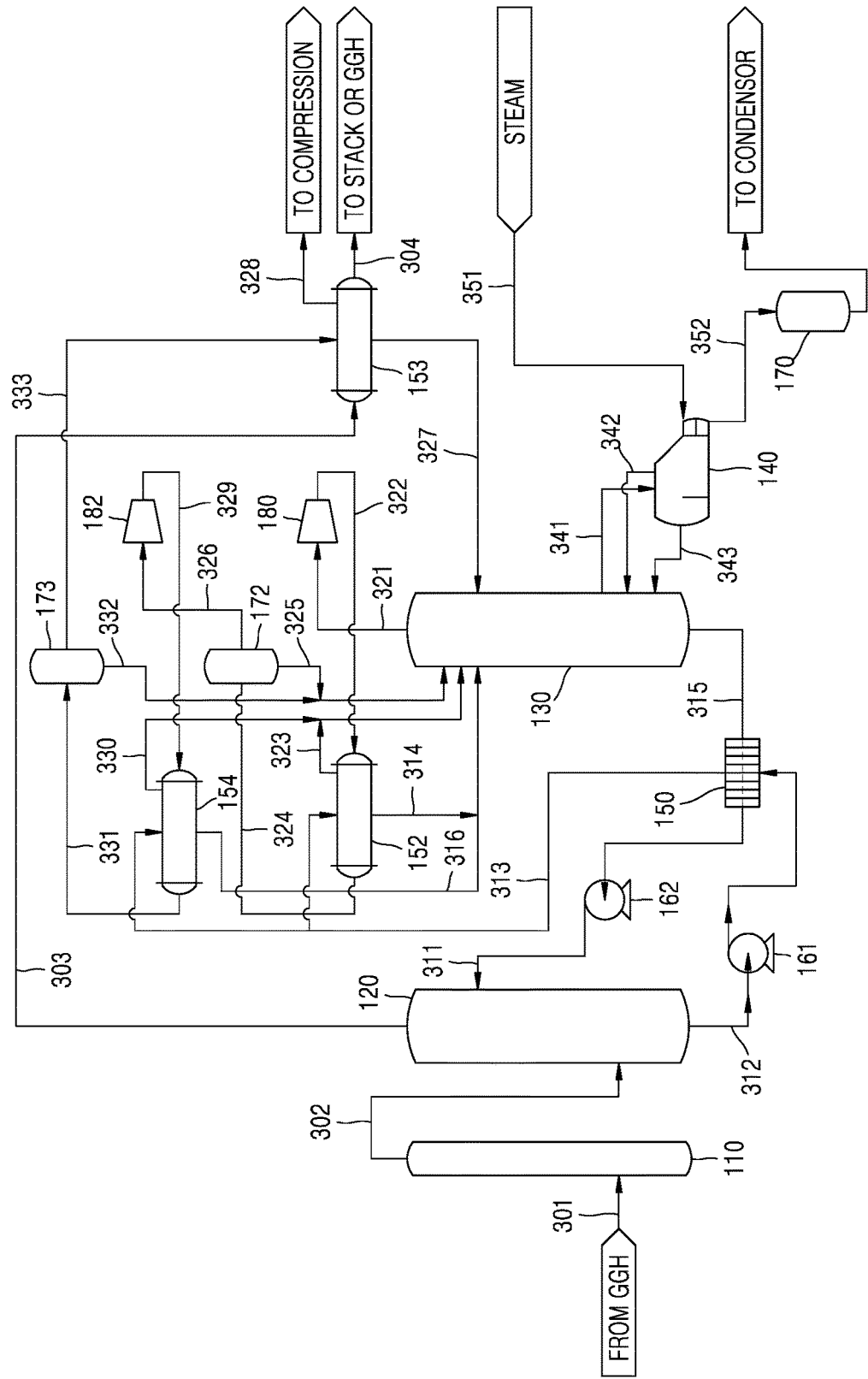
FIG. 3 illustrates a wet-type carbon dioxide capturing equipment according to another embodiment.

FIG. 3 illustrates wet-type carbon dioxide capturing equipment according to another embodiment.

Referring to FIG. 3, the wet-type carbon dioxide capturing equipment according to the present embodiment may further include a second MVR 182 and a fourth heat exchanger 154, in addition to the $CO_2$ absorption tower 120, the $CO_2$ stripping tower 130, the reboiler 140, the first heat exchanger 150, the MVR 180, and the second heat exchanger 152.

Since some of the constituent elements of the embodiment of FIG. 3 are the same as those of the embodiment of FIG. 2, descriptions of the same constituent elements are omitted or briefly discussed, and additional constituent elements are mainly discussed below.

In the embodiment of FIG. 3, for example, since the pretreatment equipment with respect to the exhaust gas discharged from a thermal power plant is the same as that according to the embodiment of FIG. 2, a description thereof is omitted.

Furthermore, since the $CO_2$ absorption tower 120, the $CO_2$ stripping tower 130, the reboiler 140, the first heat exchanger 150, the MVR 180, and the second heat exchanger 152 are the same as those described in the embodiment of FIG. 2, a description thereof is omitted.

In the embodiment of FIG. 3, since the compressed $CO_2$ gas 326 removed of the condensed water 325 in the second condensed water tank 172 still includes moisture, the compressed $CO_2$ gas 326 is input to the second MVR 182. As such, when the compressed $CO_2$ gas 326 passes through the second MVR 182, the pressure of the compressed $CO_2$ gas 326 is further increased, and thus the load of the compression equipment in the compression and liquefaction process may be reduced.

A compressed $CO_2$ gas 329 that is compressed in the second MVR 182 is input to the fourth heat exchanger 154. The fourth heat exchanger 154 may be a shell & tube heat exchanger, and the compressed $CO_2$ gas 329 may be input to a tube side of the fourth heat exchanger 154.

In the embodiment of FIG. 3, a portion of the rich solution 313 which has obtained sensible heat while passing through the first heat exchanger 150 is input to a shell side of the fourth heat exchanger 154 and exchanges heat with the compressed $CO_2$ gas 329. A mixed gas 330 of $CO_2$ gas and vapor separated from the rich solution 313 through the heat exchange in the fourth heat exchanger 154 is input to the $CO_2$ stripping tower 130 together with the mixed gas 323 of the $CO_2$ gas and the vapor separated in the second heat exchanger 152.

A rich solution 316 having $CO_2$ that is not yet separated in the fourth heat exchanger 154 is input to the upper portion of the $CO_2$ stripping tower 130 together with the rich solution 314 having $CO_2$ that is not yet separated in the second heat exchanger 152, and thus $CO_2$ is separated in the $CO_2$ stripping tower 130.

The compressed $CO_2$ gas 329 input to the fourth heat exchanger 154 loses heat and moisture thereof is condensed so that condensed water is generated. However, since the temperature of the $CO_2$ gas 329 is still high, a portion of the moisture remains as vapor. A mixed fluid 331 in which the compressed $CO_2$ gas, the vapor, and the condensed water are mixed is input to a third condensed water tank 173. Condensed water 332 separated from the mixed fluid 331 in the third condensed water tank 173 is input to the upper portion of the $CO_2$ stripping tower 130.

A compressed $CO_2$ gas 333 removed of the condensed water 332 in the third condensed water tank 173 is input to the shell side of the third heat exchanger 153. The operation of the third heat exchanger 153 and the subsequent operations are the same as those described in the embodiment of FIG. 2.

The above-described wet-type carbon dioxide capturing equipment of FIG. 3 according to the present embodiment has the same advantages as those of the embodiment of FIG. 2. In particular, in the embodiment of FIG. 3, since the second MVR 182 and the fourth heat exchanger 154 are further included in addition to the MVR 180 and the second heat exchanger 152, a portion of $CO_2$ is separated from the rich solution 313 in two steps. Accordingly, the amounts of the rich solutions 314 and 316, each having $CO_2$ that is not separated, input to the upper portion of the $CO_2$ stripping tower 130, may be further reduced. Thus, the amount of thermal energy supplied to the $CO_2$ stripping tower 130 via the reboiler 140 may be further reduced.

Figure 4:
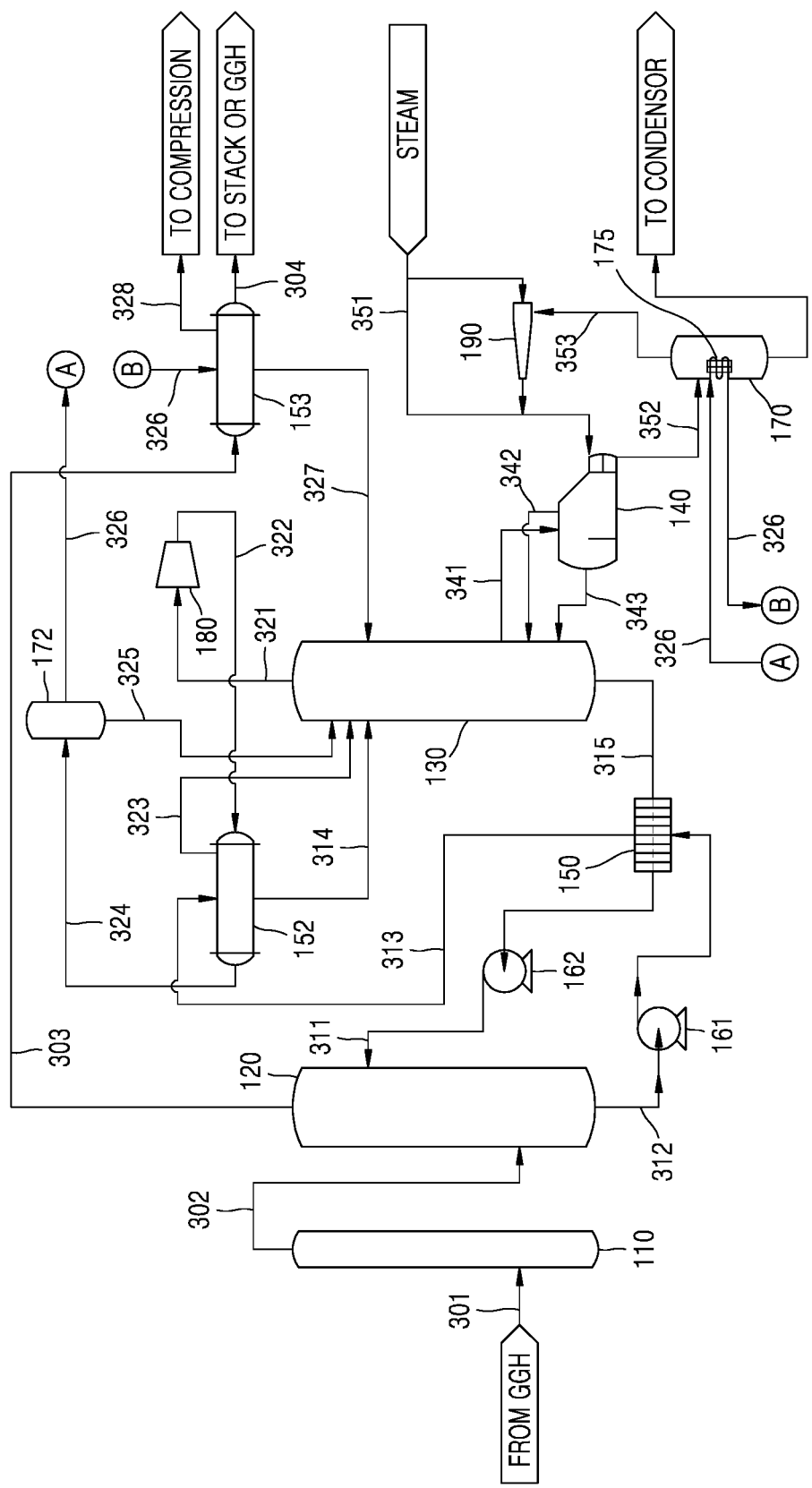
FIG. 4 illustrates a wet-type carbon dioxide capturing equipment according to another embodiment.

FIG. 4 illustrates wet-type carbon dioxide capturing equipment according to another embodiment.

Referring to FIG. 4, the wet-type carbon dioxide capturing equipment according to the present embodiment may further include a thermal vapor recompressor (TVR) 190, in addition to the $CO_2$ absorption tower 120, the $CO_2$ stripping tower 130, the reboiler 140, the first heat exchanger 150, the MVR 180, and the second heat exchanger 152.

Since some of the constituent elements of the embodiment of FIG. 4 are the same as those of the embodiment of FIG. 2, descriptions of the same constituent elements are omitted or briefly discussed, and additional constituent elements are mainly discussed below.

In the embodiment of FIG. 4, for example, since the pretreatment equipment with respect to the exhaust gas discharged from a thermal power plant is the same as that according to the embodiment of FIG. 2, a description thereof is omitted.

Furthermore, since the $CO_2$ absorption tower 120, the $CO_2$ stripping tower 130, the reboiler 140, the first heat exchanger 150, the MVR 180, and the second heat exchanger 152 are the same as those described in the embodiment of FIG. 2, descriptions thereof are omitted.

In the embodiment of FIG. 4, the thermal vapor recompressor 190 compresses revaporized vapor 353 generated in the first condensed water tank 170 and supplies the compressed revaporized vapor 353 to the reboiler 140.

As described above, the steam 351 input to the reboiler 140 loses latent heat to be condensed, and thus condensed water 352 generated accordingly is input to the first condensed water tank 170. In this state, since the temperature of the condensed water 352 in the first condensed water tank 170 that has lost latent heat is equal to or greater than about 140° C., when the thermal vapor recompressor 190 is connected to the first condensed water tank 170, the first condensed water tank 170 is depressurized and thus the revaporized vapor 353 is generated from the condensed water 352. As such, when the revaporized vapor 353 is generated, the temperature of the condensed water 352 is about 100° C. Since the revaporized vapor 353 may be compressed by the thermal vapor recompressor 190 and supplied to the reboiler 140, the amount of the steam 351 supplied to the reboiler 140 may be reduced.

Furthermore, in the embodiment of FIG. 4, the compressed $CO_2$ gas 326 removed of the condensed water 325 in the second condensed water tank 172 may be input to a separate heat exchanger 175 mounted in the first condensed water tank 170, before being input to the third heat exchanger 153.

Since the compressed $CO_2$ gas 326 is in a high-temperature state, the compressed $CO_2$ gas 326 may supply heat to the condensed water 352 through heat exchange while passing through the heat exchanger 175 mounted in the first condensed water tank 170. Accordingly, as the amount of the revaporized vapor 353 generated from the condensed water 352 is further increased, the amount of the steam 351 supplied to the reboiler 140 may be further reduced.

The compressed $CO_2$ gas 326 is input to the shell side of the third heat exchanger 153 after passing through the heat exchanger 175 mounted in the first condensed water tank 170. The operation of the third heat exchanger 153 and the subsequent operations are the same as those of the embodiment of FIG. 2.

The above-described wet-type carbon dioxide capturing equipment of FIG. 4 according to the present embodiment has the same advantages as those of the embodiment of FIG. 2. In particular, in the embodiment of FIG. 4, since the thermal vapor recompressor 190 is further included, and the revaporized vapor 353 is generated as the compressed $CO_2$ gas 326 of a high temperature exchanges heat with the condensed water 352 through the heat exchanger 175 mounted in the first condensed water tank 170, the amount of the steam supplied to the reboiler 140 may be reduced. Thus, the amount of thermal energy supplied to the $CO_2$ stripping tower 130 via the reboiler 140 may be further reduced.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. Wet-type carbon dioxide capturing equipment, comprising:
   a $CO_2$ absorption tower configured to have $CO_2$ of an exhaust gas react with an absorbent;
   a $CO_2$ stripping tower configured to separate $CO_2$ from a rich solution that absorbs the $CO_2$ in the $CO_2$ absorption tower;
   a reboiler configured to supply thermal energy to the $CO_2$ stripping tower to separate the $CO_2$ from the rich solution in the $CO_2$ stripping tower;
   a first heat exchanger configured to heat the rich solution by exchanging heat between a lean solution having the $CO_2$ separated therefrom in the $CO_2$ stripping tower and the rich solution that absorbs the $CO_2$ in the $CO_2$ absorption tower;
   a mechanical vapor recompressor (MVR) configured to compress a $CO_2$ gas that is separated in the $CO_2$ stripping tower; and
   a second heat exchanger configured to separate a portion of $CO_2$ from the rich solution by heating the rich solution by exchanging heat between the $CO_2$ gas compressed in the MVR and the rich solution passing through the first heat exchanger,
   wherein the rich solution having $CO_2$ that is not separated in the second heat exchanger is input to the $CO_2$ stripping tower where the $CO_2$ is separated.

2. The wet-type carbon dioxide capturing equipment of claim 1, wherein the first heat exchanger is a plate-type heat exchanger, the second heat exchanger is a shell & tube heat exchanger, the $CO_2$ gas compressed in the mechanical vapor recompressor is input to a tube side of the second heat exchanger, and the rich solution passing through the first heat exchanger is input to a shell side of the second heat exchanger.

3. The wet-type carbon dioxide capturing equipment of claim 1, wherein steam is input to the reboiler as a heat source, the steam is condensed by transferring latent heat to the $CO_2$ stripping tower via the reboiler, and condensed water generated as the steam is condensed is input to a first condensed water tank.

4. The wet-type carbon dioxide capturing equipment of claim 3, wherein the condensed water is generated as the $CO_2$ gas input to the second heat exchanger loses heat, a mixed fluid of the $CO_2$ gas, vapor, and the condensed water is input to a second condensed water tank, and the condensed water separated from the mixed fluid in the second condensed water tank is input to the $CO_2$ stripping tower.

5. The wet-type carbon dioxide capturing equipment of claim 4, further comprising a third heat exchanger that is configured to exchange heat between the exhaust gas removed of the $CO_2$ in the $CO_2$ absorption tower and the $CO_2$ gas removed of the condensed water in the second condensed water tank.

6. The wet-type carbon dioxide capturing equipment of claim 4, further comprising:
   a second mechanical vapor recompressor (MVR) configured to compress the $CO_2$ gas removed of the condensed water in the second condensed water tank;
   a fourth heat exchanger configured to separate a portion of the $CO_2$ from the rich solution by heating the rich solution by exchanging heat between the compressed $CO_2$ gas compressed in the second MVR and a portion of the rich solution passing through the first heat exchanger,
   wherein the rich solution having $CO_2$ that is not separated in the fourth heat exchanger is input to the $CO_2$ stripping tower together with the rich solution having $CO_2$ that is not separated in the second heat exchanger.

7. The wet-type carbon dioxide capturing equipment of claim 6, wherein the fourth heat exchanger is a shell & tube heat exchanger, the $CO_2$ gas compressed in the second mechanical vapor recompressor is input to a tube side of the fourth heat exchanger, and a portion of the rich solution passing through the first heat exchanger is input to a shell side of the fourth heat exchanger.

8. The wet-type carbon dioxide capturing equipment of claim 6, wherein the condensed water is generated as the $CO_2$ gas input to the fourth heat exchanger loses heat, a mixed fluid of the $CO_2$ gas, vapor, and the condensed water is input to a third condensed water tank, and the condensed water separated from the mixed fluid in the third condensed water tank is input to the $CO_2$ stripping tower.

9. The wet-type carbon dioxide capturing equipment of claim 8, further comprising a third heat exchanger that is configured to exchange heat between the exhaust gas removed of the $CO_2$ in the $CO_2$ absorption tower and the $CO_2$ gas removed of the condensed water in the third condensed water tank.

10. The wet-type carbon dioxide capturing equipment of claim 4, further comprising a thermal vapor recompressor (TVR) that is configured to compress revaporized vapor generated in the first condensed water tank and supply the revaporized vapor to the reboiler.

11. The wet-type carbon dioxide capturing equipment of claim 10, wherein a heat exchanger is mounted in the first condensed water tank, and the heat exchanger exchanges heat between the $CO_2$ gas removed of the condensed water in the second condensed water tank and the condensed water in the first condensed water tank.

12. The wet-type carbon dioxide capturing equipment of claim 11, further comprising a third heat exchanger that is configured to exchange heat between the exhaust gas removed of the $CO_2$ in the $CO_2$ absorption tower and the $CO_2$ gas passing through the heat exchanger mounted in the first condensed water tank.

\* \* \* \* \*